US012299709B2

(12) United States Patent
Dix

(10) Patent No.: US 12,299,709 B2
(45) Date of Patent: May 13, 2025

(54) DISTRIBUTED PROMOTIONAL PLATFORM FOR PROMOTING SECURITIES INFORMATION

(71) Applicant: Andrew Dix, Beachwood, OH (US)

(72) Inventor: Andrew Dix, Beachwood, OH (US)

(*) Notice: Subject to any disclaimer, the term of this patent is extended or adjusted under 35 U.S.C. 154(b) by 307 days.

(21) Appl. No.: 17/865,425

(22) Filed: Jul. 15, 2022

(65) Prior Publication Data

US 2022/0351235 A1 Nov. 3, 2022

Related U.S. Application Data

(63) Continuation-in-part of application No. 17/329,892, filed on May 25, 2021, now abandoned, which is a continuation of application No. 15/663,286, filed on Jul. 28, 2017, now Pat. No. 11,017,424, which is a continuation-in-part of application No. 15/411,238, filed on Jan. 20, 2017, now Pat. No. 9,747,379.

(51) Int. Cl.
| | |
|---|---|
| G06F 16/901 | (2019.01) |
| G06F 16/903 | (2019.01) |
| G06Q 30/0241 | (2023.01) |
| G06Q 40/06 | (2012.01) |

(52) U.S. Cl.
CPC ....... *G06Q 30/0241* (2013.01); *G06F 16/901* (2019.01); *G06F 16/90335* (2019.01); *G06Q 40/06* (2013.01)

(58) Field of Classification Search
CPC .. G06Q 30/0241; G06Q 40/06; G06F 16/901; G06F 16/90335
See application file for complete search history.

(56) References Cited

U.S. PATENT DOCUMENTS

| | | | | |
|---|---|---|---|---|
| 2005/0125316 A1* | 6/2005 | Levering | ............... | G06Q 40/04 705/30 |
| 2008/0270319 A1* | 10/2008 | Torabi | .................... | G06Q 30/06 705/36 R |
| 2009/0055252 A1* | 2/2009 | Samuel | .................. | G06Q 30/02 705/14.61 |
| 2010/0161508 A1* | 6/2010 | Planitzer | .............. | G06Q 30/018 705/36 R |
| 2012/0316888 A1* | 12/2012 | Stacey | ................... | G06Q 10/10 705/1.1 |
| 2014/0278935 A1* | 9/2014 | Gara | .................. | G06Q 30/0251 705/14.45 |
| 2017/0011463 A1* | 1/2017 | Pizzi | ...................... | G06Q 40/06 |
| 2017/0357993 A1* | 12/2017 | Thuesen | ............ | G06Q 30/0214 |

* cited by examiner

*Primary Examiner* — Cam Linh T Nguyen
(74) *Attorney, Agent, or Firm* — Gearhart Law LLC

(57) ABSTRACT

Systems and methods are provided for promoting securities information. The method includes: storing, in a memory, a database of securities information; indexing, using a processor, the database of securities information to enable a first user to search through the database of securities information; displaying, using a graphical user interface, a digital searching tool, wherein the first user is able to search through the indexed database on the graphical user interface using the digital searching tool; receiving, from the first user, using the graphical user interface, one or more filings selected from the indexed database; and transforming at least one of the selected filings into a shareable digital widget, wherein the widget, when shared, is configured to display a description of each of the at least one of the selected filings to one or more second users.

17 Claims, 11 Drawing Sheets

Which Form C filing would you like to promote?

This paragraph explains to the user what promoting a filing does and how it will benefit them. This paragraph explains to the user what promoting a filing does and how it will benefit them. This paragraph explains to the user what promoting a filing does and how it will benefit them. This paragraph explains to the user what promoting a filing does and how it will benefit them.

Racr\a, Inc.
On Republic
Filed At: July 18, 2016 03:21:23

Mutemove, Inc.
On Republic
Filed At: July 19, 2016 01:29:38

Yeuncy, LLC
On Republic
Filed At: July 18, 2016 10:08:41

Form Froms a Box Inc.
On Republic
Filed At: July 18, 2018 04:46:34

Racr\a, Inc.
On Republic
Filed At: July 18, 2016 07:18:14

FIG. 5

DISTRIBUTED PROMOTIONAL PLATFORM FOR PROMOTING SECURITIES INFORMATION

CROSS-REFERENCE TO RELATED APPLICATIONS SECTION

This application is a U.S. Non-Provisional patent application and Continuation-in-Part (CIP) of U.S. Non-Provisional patent application Ser. No. 17/329,892 filed on May 25, 2021, which is a U.S. Non-Provisional patent application and Continuation of U.S. Non-Provisional patent application Ser. No. 15/663,286 filed on Jul. 28, 2017 and patented as U.S. Pat. No. 11,017,424, which is a U.S. Non-Provisional patent application and CIP of U.S. Non-Provisional patent application Ser. No. 15/411,238 filed on Jan. 20, 2017 and patented as U.S. Pat. No. 9,747,379, the entire contents of which are hereby incorporated by reference in their entirety.

FIELD OF THE EMBODIMENTS

This invention relates to promoting securities listings and, in particular, to selling and creating digital widgets for the promotion of securities listings on various digital applications and websites, enabling users to more easily locate and invest money in such securities offers.

BACKGROUND OF THE EMBODIMENTS

The Jumpstart Our Business Startups (JOBS) Act of 2012 was signed into law on Apr. 5, 2012. This Act created several new securities exemptions. In particular, three sections of the JOBS Act legalized investment crowdfunding in various forms. In effect, crowdfunding may be defined as "general solicitation" or advertising via various types of media. Today, a large amount of promotional material is published online in a digital format and, prominently, on social media.

The three new securities exemptions under the JOBS Act include: Title II (referencing Accredited Crowdfunding, Reg. 506c), Title III (referencing Retail Crowdfunding, Reg. CF), and Title IV (referencing Reg. A+).

While Title II and Title IV are not encumbered with promotional restrictions beyond anti-fraud and suitability requirements, Title III may only be presented as a "Tombstone" type advertisement only. Tombstone advertisements are typically a type of advertisement containing prescribed information as limited by the Securities and Exchange Commission.

As mandated under Regulation CF, notices for offerings are limited to the following:
  A statement that the issuer is conducting an offering pursuant to Section 4(a)(6) of the Securities Act;
  The name of the intermediary through which the offering is being conducted and a link directing the potential investor to the intermediary's platform
  The terms of the offering (the amount of securities offered, the nature of the securities, the price of the securities and the closing date of the offering period); and
  Factual information about the legal identity and business location of the issuer, limited to the name of the issuer of the security, the address, phone number and website of the issuer, the e-mail address of a representative of the issuer and a brief description of the business of the issuer.

Title III is an exemption that allows an issuer to raise up to S1 million, thus promotion may be constrained due to a limited budget. A method is, thus, needed to resolve the problems with this challenge.

Examples of related art are described below:

U.S. Pat. No. 8,234,193 provides for systems and methods for providing online promotions integrated with social network-based platforms. Promotion details such as rules, offered prizes, incentives and descriptions, survey questions, display banners, terms and conditions, privacy policy, and social networks to integrate the promotion with, are provided by the sponsoring organization to a server. The server generates a custom promotion application and/or widget for integrating with the organization's social network webpage and/or webpages external to social networks. A participant enters the promotion through these webpages or other links and lists friends in the social network to receive an invitation to enter the promotion. Viral features such as friend invite features, newsfeeds, minifeeds, other features that display online activities of users and people in the users' social network, notifications, requests, and other social network-based platform features to deliver messages to members of the one or more social network-based platforms further spread the word about the organization's promotion.

U.S. Pat. No. 8,527,344 provides for systems and methods in which users of a social networking system are provided with advertisements when accessing content associated with the social networking system. The content of such advertisement may be generated by other users of the social networking system. An advertiser may provide an advertising template containing an advertised message and fields wherein a user can input an endorsement. The social networking system generates a user interface responsive to the template and provides the user interface to an endorsing user to receive the user's endorsement for the advertised product or event. The social networking system generates an advertisement responsive to the advertisement content provided by the advertiser and the endorsement content provided by the endorsing user. The social networking user can provide the generated advertisements to viewing users who meet the advertisement's targeting criteria and display criteria provided by the endorsing user.

U.S. Pat. No. 8,538,846 provides for systems and methods for providing online promotions integrated with social network-based platforms. Promotion details such as rules, offered prizes, incentives and descriptions, survey questions, display banners, terms and conditions, privacy policy, and social networks to integrate the promotion with, are provided by the sponsoring organization to a server. The server generates a custom promotion application and/or widget for integrating with the organization's social network webpage and/or webpages external to social networks. A participant enters the promotion through these webpages or other links and lists friends in the social network to receive an invitation to enter the promotion. Viral features such as friend invite features, newsfeeds, minifeeds, other features that display online activities of users and people in the users' social network, notifications, requests, and other social network-based platform features to deliver messages to members of the one or more social network-based platforms further spread the word about the organization's promotion.

U.S. Patent Application No. 2013/0185228 provides for a computer based system for the collection, analysis and dissemination of data related to financial transactions using an Internet interface in order to minimize investment risk. The system includes a computer processor and a plurality of software applications adapted to run on said processor for performing a variety of functions. The processor and software together operate as a computer engine. A database is connected with the engine for storing data related to the transactions. Means are provided for inputting data to the database, and an application programing interface is carried by the engine for communication with software carried on third party systems through data feeds connected to the engine. A web application interface connected to the engine allows a user of the system to access the engine through a local terminal and display. The application interface permits the user to conduct searches of the database for information pertaining to a particular financial deal, said deal including a financial transaction or project and project profile. The software applications include at least one application programming interface for tracking deal analysis and storing the analysis on the database. The application interface permits a user to view the stored analysis on the users local display.

U.S. Patent Application No. 2014/0012663 provides for systems and methods for providing online promotions integrated with social network-based platforms are disclosed. Promotion details such as rules, offered prizes, incentives and descriptions, survey questions, display banners, terms and conditions, privacy policy, and social networks to integrate the promotion with, are provided by the sponsoring organization to a server. The server generates a custom promotion application and/or widget for integrating with the organization's social network webpage and/or webpages external to social networks. A participant enters the promotion through these webpages or other links and lists friends in the social network to receive an invitation to enter the promotion. Viral features are used to deliver messages to members of the one or more social network-based platforms so as to further spread the word about the organization's promotion.

U.S. Patent Application No. 2014/0025473 provides for a crowdfunding platform can receive an indication that an entity has completed an action. Examples of an entity include a funder, a campaign account owner, a third party and a combination thereof. Examples of actions include making an investment, subscribing to a service, joining an entity's social network, etc. Upon receiving the indication, an account (e.g., a crowdfund account such as an investor and/or campaign account) can be credited with a value that can correspond to the completion of the action. Value can be transferred from an external account (such as, e.g., an external virtual currency account, etc.) to a crowdfund account and vice versa. If the transferor account is denominated in a different unit of value than the transferee account, an exchange rate can be determined and applied to the transaction.

U.S. Patent Application No. 2014/0040157 provides for systems and methods in which offers are presented to one or more users of a crowdfunding platform based upon information gathered from multiple users' activities across one or more campaigns. An offer may be provided to the fundraiser based on a campaign category, a campaign keyword, a campaign profile, and offer profile or user activity history. A user profile may be used to determine an offer by comparing the profile to attributes of one or more offers. The selected offer can be presented to users such as funders, fundraisers and others.

U.S. Patent Application No. 2014/0172505 provides for methods and systems for online support and promotion of authors. Upon allocation of creations to various categories, an author may be supported and promoted by an audience. The audience comprising multiple unregistered users may provide their assessment by viewing and listening to the creations of the author, leaving their comments or making votes. The assessment of the audience may increase a rating of the author or his creations. A high rating may prompt investors to provide a financial support to the author or his creations. The investors may provide the financial support in any amount and within any time period. Based on the financial support, an interest or a fixed amount from future income of the author or his creations may be provided to the investors and a service provider associated with online support and promotion of authors.

U.S. Patent Application No. 2015/0017611 provides for an apparatus for financial education, entrepreneurship education and life management. The apparatus can include a housing, at least one storage compartment received within the housing and including an interior cavity, a coin acceptor assembly adapted to receive a coin, determine the denomination of the coin, and deposit the coin into the storage compartment, electronic circuitry communicatively coupled to the coin acceptor assembly, a display device communicatively coupled to the electronic circuitry, at least one input device communicatively coupled to the electronic circuitry, wherein the electronic circuitry includes at least one non-transitory computer-readable medium storing executable instructions and a processor adapted to execute the instructions, wherein the instructions are adapted to display a graphic interface on the display device, and to receive input from a user via the at least one input device, so as to allow the user to manage a user account, the user account including a monetary balance.

International Patent Application No. WO2014/174398 provides for a system for competitive investment raising for a venture project. The system may include a memory to store data on a number of venture projects, and a processor communicatively coupled to the memory. The processor may be configured to receive the data on the number of venture projects, and assign one or more of the number of venture projects to a venture capitalist. The venture project assigned to the venture capitalist may be an assigned venture project. The processor may be also configured to provide a pre-investment amount to the assigned venture project; periodically receive a progress report from a representative of the assigned venture project; periodically receive an evaluation of the assigned venture project; based on the evaluation, periodically determine failed venture projects that drop out of the competitive investment raising; and determine a winning venture project. The winning venture project may receive an investment amount.

It is noted that none of the art described above addresses all of the issues that the present invention does.

SUMMARY OF THE EMBODIMENTS

According to an embodiment of the present invention, a method is provided for promoting securities information. The method includes: storing, in a memory, a database of securities information; indexing, using a processor, the database of securities information to enable a first user to search through the database of securities information; displaying, using a graphical user interface, a digital searching tool, wherein the first user is able to search through the indexed database on the graphical user interface using the digital searching tool; receiving, from the first user, using the graphical user interface, one or more filings selected from the indexed database; and transforming at least one of the selected filings into a shareable digital widget, wherein the widget, when shared, is configured to display a description of each of the at least one of the selected filings to one or more second users. The method additionally includes creating, using the graphical user interface, a personal profile for the first user and a personal profile for at least one of the one or more second users.

According to another aspect of the present invention, a method is provided for promoting securities information. The method includes: storing, in a memory, a database of securities information; indexing, using a processor, the database of securities information to enable a first user to search through the database of securities information; displaying, using a graphical user interface, a digital searching tool, wherein the first user is able to search through the indexed database on the graphical user interface using the digital searching tool; and transforming one or more filings into a shareable digital widget, wherein the widget, when shared, is configured to display a description of each of the one or more filings to one or more second users. The method additionally includes creating, using the graphical user interface, a personal profile for the first user and a personal profile for at least one of the one or more second users.

It is an object of the present invention to provide for the method for promoting securities information, wherein the widget is further configured to display the description of each of the at least one of the selected filings for a set duration of time.

It is an object of the present invention to provide for the method for promoting securities information, wherein the method further includes enabling, using the graphical user interface, the first user to communicate with at least one of the one or more second users.

It is an object of the present invention to provide for the method for promoting securities information, wherein the method further includes enabling the first user to accept one or more followers to the personal profile of the first user.

It is an object of the present invention to provide for the method for promoting securities information, wherein the personal profile of the first user is affiliated with a page or dashboard that includes one or more crowdfunded securities.

It is an object of the present invention to provide for the method for promoting securities information, wherein the receiving one or more filings further includes receiving payment from the first user, wherein the payment from the first user is used to purchase the transforming the at least one of the one or more filings into the shareable digital widget.

It is an object of the present invention to provide for the method for promoting securities information, wherein the widget is further configured to display the description of each of the at least one of the selected filings for a set duration of time, and wherein the set duration of time is determined upon an amount of time purchased by the first user.

It is an object of the present invention to provide for the method for promoting securities information, wherein the widget is further configured to display the description of each of the at least one of the one or more filings when opened on a portable electronic device.

It is an object of the present invention to provide for the method for promoting securities information, wherein the widget is further configured to enable a third user to share the widget.

It is an object of the present invention to provide for the method for promoting securities information, wherein the widget is further configured to provide the one or more second users with a link to a webpage listing an original offering for each link described on the widget.

It is an object of the present invention to provide for the method for promoting securities information, wherein the widget is further configured to enable a third user to purchase a promotion for an individual listing displayed on the widget.

It is an object of the present invention to provide for the method for promoting securities information, wherein the description of each of the at least one of the selected filings includes a text-based advertisement.

It is an object of the present invention to provide for the method for promoting securities information, wherein the digital searching tool further includes one or more optional classifications which the first user can use to narrow a search of the database.

It is an object of the present invention to provide for the method for promoting securities information, wherein each of the one or more filings is randomly selected by the processor.

It is an object of the present invention to provide for the method for promoting securities information, wherein, each time the digital application or website containing the widget is opened, a description of a new set of randomly selected filings is displayed.

BRIEF DESCRIPTION OF THE DRAWINGS

FIG. 5 shows a diagram of a request to promote one or more listings, according to an embodiment of the present invention.

DESCRIPTION OF THE PREFERRED EMBODIMENTS

Figure 1:
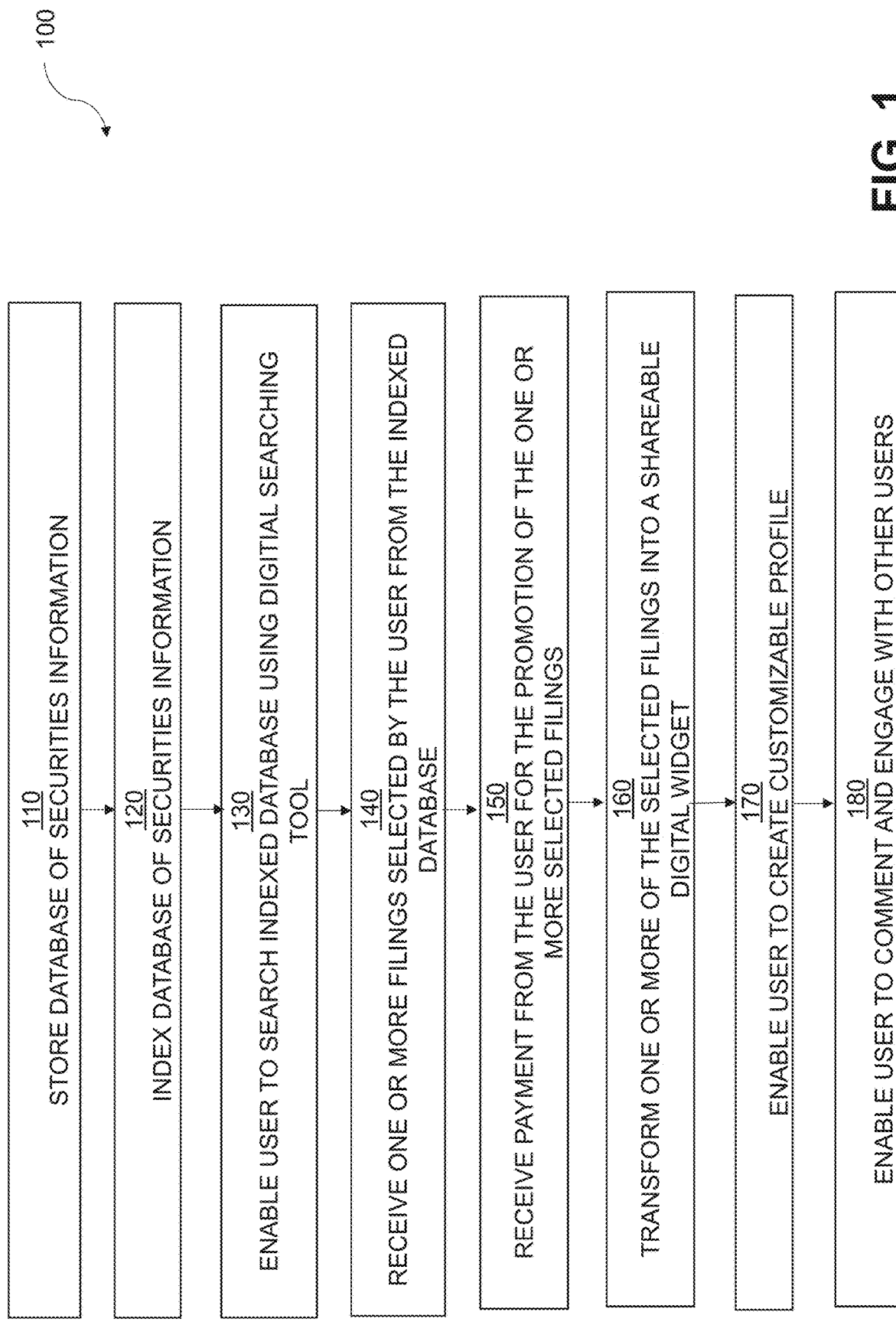
FIG. 1 shows a flowchart of a method for promoting securities information, according to an embodiment of the present invention.

The preferred embodiments of the present invention will now be described with reference to the drawings. Identical elements in the various figures are identified with the same reference numerals.

Title III of the JOBS Act of 2012 is an exemption that allows an issuer to raise up to $1 million, thus promotion may be constrained due to a limited budget. The present invention seeks to leverage this transformational shift in securities promotion in a cost effective and distributed environment.

According to an embodiment of the present invention, a method is provided which uniquely solves this challenge with an automated Tombstone creation, social sharing and distributed application. Other websites may embed the promotional widget for a percentage of the generated revenue of the promoted advertisements.

According to an embodiment, the present invention keys off of filings by the Securities and Exchange Commission (SEC) submitted by issuing companies. The present invention ingests these legal documents, including Title II, Title III and Title IV [Reg D 506c, Reg CF, Reg A+]. According to an embodiment, the present invention further ingests any user submitted crowdfunded securities offering, which are generally able to be solicited or publicly promoted, that may include an image or images, a link to data or other content, and/or an embedding into other content or feeds, including text, video, RSS, or any other content that may include paid promotion that is transacted directly on the platform that may be distributed across one or more websites.

A digital application then parses and structures targeted fields for its database. This database is searchable, indexible, and shareable based of off indexed terms.

According to an embodiment, the fields specific to an issuer's offering filings [Reg D 506c, Reg CF, Reg A+] are segregated and displayed as content, providing users with the ability to read, review, search, sort, and download these public filings. A discoverable list of "Most Recent Filings" are displayed on the home page of the application and any other website that has embedded the most recent filings widget.

The most recent filings widget allows a user the ability to review the filing, share the filing via social media, and/or promote the filing via a paid transaction. Users may also search and choose to promote filings within an integrated interface or have the option to promote existing advertisements for longer periods or enhanced locations.

According to an embodiment, the present invention causes a paid promotion to automatically become a "Tombstone" type advertisement that is compliant with existing securities laws. A user promoting an offer may simply and efficiently create a display advertisement with very little interaction and a very low cost. The compliant display advertisement will then promote the issuers security offer linking to the official offering page.

This "Tombstone" advertisement may also be legally shared across various social media platforms directing viewers to the listing platform or Broker Dealer. The application will track the social media shares thus monitoring the overall popularity of the offer providing further incentives for issuers and supporters to continue to share the offer. According to an embodiment, the application disclosed in the present invention automatically generates a "heat map" type widget to drive gamification of the offer and encourage sharing for maximum social reach. Investors in these offers will be encouraged to help promote by both sharing [free] and/or paying incremental fees to gain further prominence in the application.

According to an embodiment, both the "Most Recent Filings" and the promoted "Tombstones" may be placed and/or shared on any other website. According to an embodiment, the host of the website that syndicates the application receives compensation based off of traffic generated and directly promoted Tombstones.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a flowchart of a method 100 for promoting securities information is illustratively depicted, in accordance with an embodiment of the present invention.

At step 110, a system, composed of both hardware and software, stores a database of securities information, such as, e.g., automated information, as updated by the Securities and Exchange Commission (SEC) disclosure database, the Electronic Data Gathering, Analysis, and Retrieval (EDGAR) system.

At step 120, the present invention takes the automated information from the EDGAR system and reindexes the information, enabling a user (at step 130) to search through the indexed database. The system also enables the indexed database and a searching tool to be displayed on a proprietary search and review platform, such as, e.g., a website content platform. According to an embodiment, various fields of the data are fielded and presented to users.

According to an embodiment, the searching tool enables users to narrow their search through the indexed database by using a plurality of optional criteria.

At step 140, the system receives a listing of one or more filings selected by the user for the purposes of promoting the filings. According to an embodiment, the system may also suggest one or more filings to the user.

At step 150, once the user has determined which filings the user desires to promote, the system receives payment from the user for the promotion. In addition to the creation of the promotion (in the form of a widget), the payment also determines the length of time that the filing will be promoted.

At step 160, the promotional widget is created. A portion of the information for the selected filing or filings is presented as an automated standalone, embeddable widget for basic information derived from securities exemptions that link back to individual issuer filings on the website content platform.

At step 170, the system enables the user to create a customizable profile. According to an embodiment, the customizable profile includes a personalized page and/or dashboard of selected offerings that mat and/or may not include user-added notes, prices, links, etc., and the ability to accept followers. According to an embodiment, the user is able to create the user-added notes, prices, links, etc.

According to an embodiment, the user is enabled to create the customizable profile such that the profile is affiliated with the page and/or dashboard that includes the crowdfunded securities, including, e.g., Reg. D, Reg. A, and Reg. CF, among any other international securities.

At step 180, the system enables the user to comment and/or engage with other users. According to an embodiment, the user is able to comment and/or engage with other users using the widget. According to an embodiment, the widget is accessible on a suitable electronic device such as, but not limited to, a smartphone, a tablet, a laptop, a personal computer, and/or any other suitable electronic device.

This basic embeddable widget provides the ability for users to either share, via various social networks or other communication tools, or promote, via a purchase, individual listings.

Promoted listings create text based display advertisements for the display within a separate embeddable promote widget. A user may purchase a promotion as an advertisement for a specific securities offer via an online, e-commerce interface. Following the purchase, the individual display as presents itself within the promote widget for the purchased amount of time. The display ads link back to the issuing company's offer page on the hosting website.

According to an embodiment, a website that embeds the promote widget and processes transactions via a direct link from the embedded widget on the website will retain a portion of any transaction to promote any individual listing.

Advantageously, the application is designed to boost promotional opportunities for both rewards based and investment based crowdfunded offerings.

According to an embodiment, the software application automatically captures targeted information publicly available on crowdfunded offerings. This information would either be initiated by a user, by entering a campaign URL, or configured to act automatically. By targeting a specific URL, information would be published within a widget posted on a web site. Information including; Description, funding target, timing, amount raised would be displayed in a laddered presentation.

According to an embodiment, the widget is embeddable onto any other site using JavaScript, iframe or other similar technology. According to an embodiment, the client site is able to choose to select automatically populated campaigns or select manual population of campaigns. Automatically populated campaigns would be selected from the host site.

According to an embodiment, the crowdfunding offer information is displayed as informational content.

The application would allow crowdfunding campaign owners to choose to anchor their crowdfunding campaign project at the top of the widget for a fee. Any client site that hosts the widget would be given the choice to display promoted offers. If that selection was made, the client site would receive a portion of the revenue generated. If the client site selected to sell promoted offers directly, the client would receive the majority of the revenue generated. All transactions would be processed by the host site. Additional display options for revenue generation would be offered to the client sites using responsive technology.

Using unique identifiers, the embeddable widget would, according to an embodiment, track viewable impressions, geographic locations, domains, and user actions. Periodic updates would be automatically initiated to update campaign information on a rolling basis delivering a unique user experience for client sites.

Figure 2:
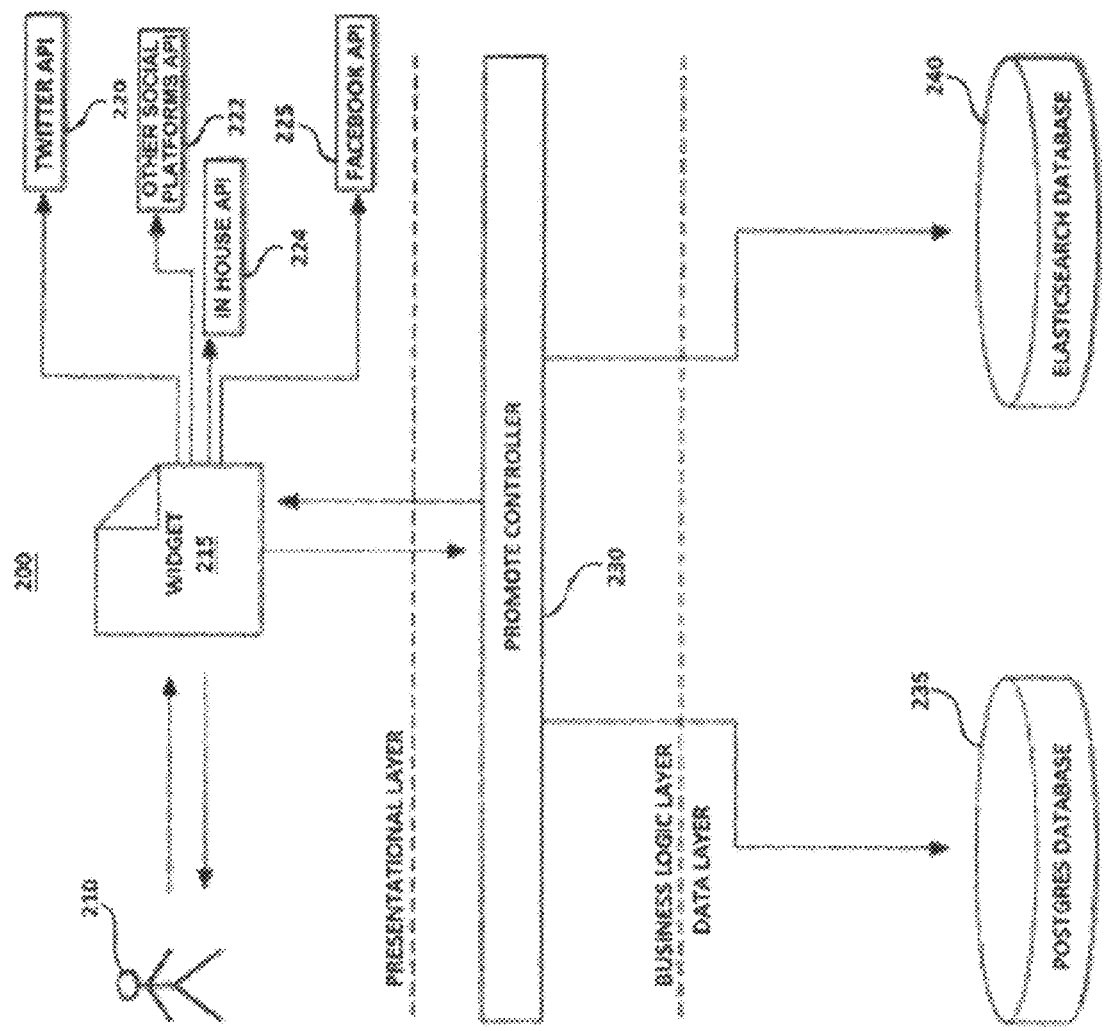
FIG. 2 shows a block/flow diagram of a system and method for promoting securities information, according to an embodiment of the present invention.

Referring now to FIG. 2, a block/flow diagram of a system and method 200 for promoting securities information is illustratively depicted, in accordance with an embodiment of the present invention.

The system 200 is separated into a presentational layer, a business logic layer, and a data layer.

According to an embodiment, the presentational layer includes a user 210, a widget 215, one or more Application Program Interfaces (APIs) 220, 222, 224, 225. According to an embodiment, the user 210 accesses the widget 215. The widget 215 can be accessed on a PC, a portable electronic device, or any other suitable device, while maintaining the spirit of the present invention.

According to an embodiment, the widget 215 is an embeddable piece of code that any user 210 can put onto their website or digital application, such as, e.g., a Twitter API 220, an in house API 224, a Facebook API 225, and/or any other social media platform API 222. Once the widget 215 is put onto the user's 210 website or digital application, any subsequent users 210 who view the website or digital application can see a randomized list of securities listings. According to an embodiment, the widget 215 includes up to 10 promoted filings. Of course, other quantities of promoted filings may also be shown on the widget 215.

Each promoted filing on the widget 215 provides the user 210 with an option to share that promotion on their own social media accounts. According to an embodiment, the link that the user 210 shares is input by the promoter of the filing. According to an embodiment, when a user 210 promotes a filing, that user is responsible for linking to the platform in which a user 210 can invest.

The business logic layer includes a promote controller 230, which is coupled, either through a wired or wireless connection, to the widget 215. The promote controller 230 performs much of the logic in the application. Its main job is to marry data from a postgres database 235 and an elasticsearch database 240 (explained below) and handle any formatting needs that may exist.

The data layer includes the postgres database 235 and the elasticsearch database 240. The postgres database 235 houses any transactional information relating to various promoted filings. The elasticsearch database 240 houses all of the information regarding the system's filings. It is populated by the application directly from the SEC's EDGAR service.

The first interaction with the system is when the user 210 requests the widget 215 from the system's application. This request comes in the form of a user 210 visiting a webpage that has the widget on it. The application then requests the data from the promote controller 230.

The promote controller 230 first gathers data from the postgres database 235 regarding what filings are currently being promoted. Then, based on the previous information, the application gathers the necessary filing data from the elasticsearch database 240. The promote controller 230 then marries the data from the postgres database 235 and the elasticsearch database 240 together, formats it appropriately, and inserts it into one or more predetermined HTML templates. The promote controller 230 that sends, to a client, the one or more filled-in HTML templates. Once the client is in possession of the filled-in HTML templates, the system executed JavaScript code to retrieve the number of shares that each URL has received on a social media platform. The fully rendered widget 215 is then shown to the user 210.

Both a basic widget and a promote widget may be displayed on any website.

According to an embodiment, the application that manages both the basic widget and the promote widget manages and distributes all content while tracking distribution, impressions, and transactions of all distributed and syndicated content.

Figure 3:
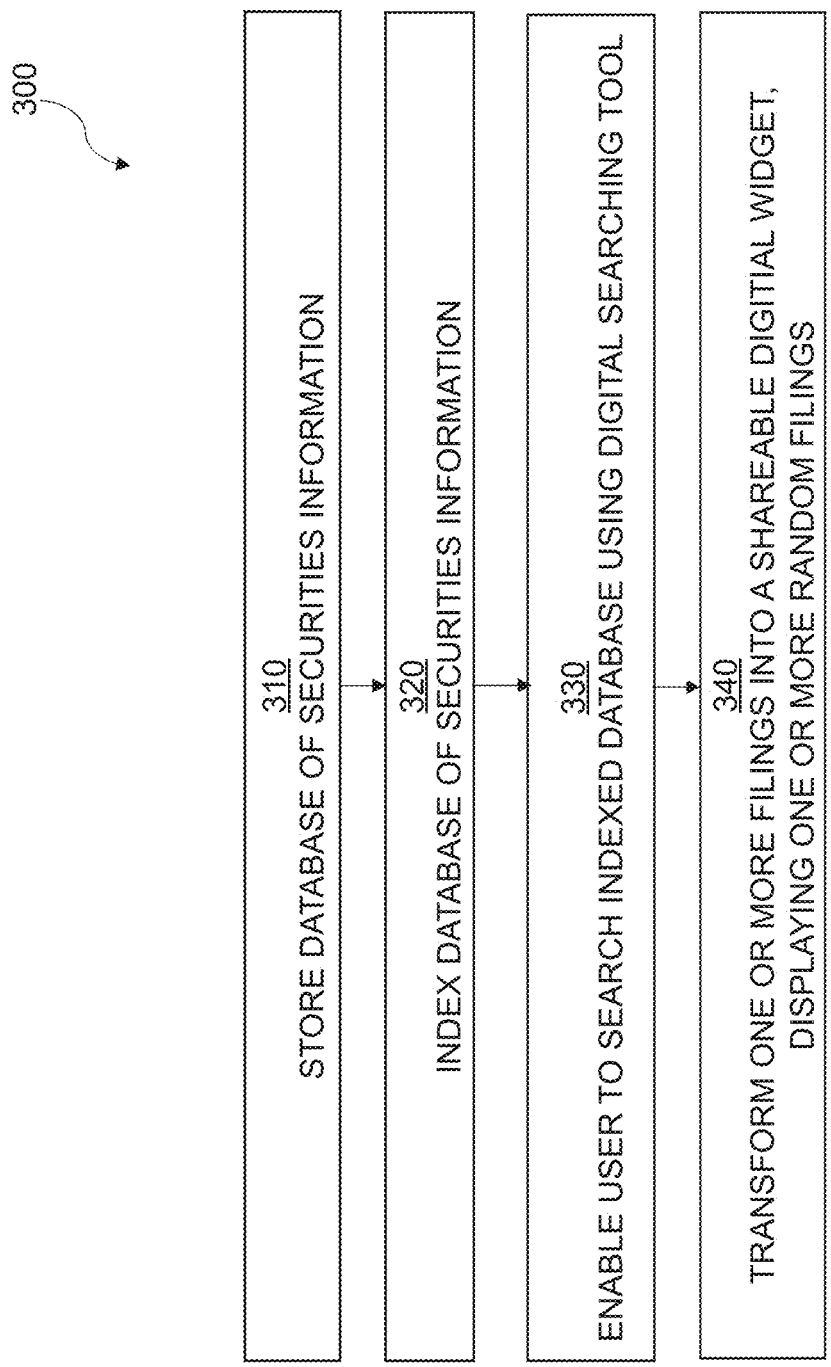
FIG. 3 shows a flowchart of a method for promoting securities information, according to an embodiment of the present invention.

Referring now to FIG. 3, a flowchart of a method 300 for promoting securities information is illustratively depicted, in accordance with an embodiment of the present invention.

At step 310, a system, composed of both hardware and software, stores a database of securities information, such as, e.g., automated information, as updated by the Securities and Exchange Commission (SEC) disclosure database, the Electronic Data Gathering, Analysis, and Retrieval (EDGAR) system.

At step 320, the present invention takes the automated information from the EDGAR system and reindexes the information, enabling a user (at step 330) to search through the indexed database. The system also enables the indexed database and a searching tool to be displayed on a proprietary search and review platform, such as, e.g., a website content platform. According to an embodiment, various fields of the data are fielded and presented to users.

According to an embodiment, the searching tool enables users to narrow their search through the indexed database by using a plurality of optional criteria.

At step 340, the system creates a widget, which the user can embed onto a website and/or digital application. The widget displays one or more random securities filings. According to an embodiment, each of the randomized securities filings is a filing that has been promoted using, e.g., the method 100 shown in FIG. 1.

Figure 4:
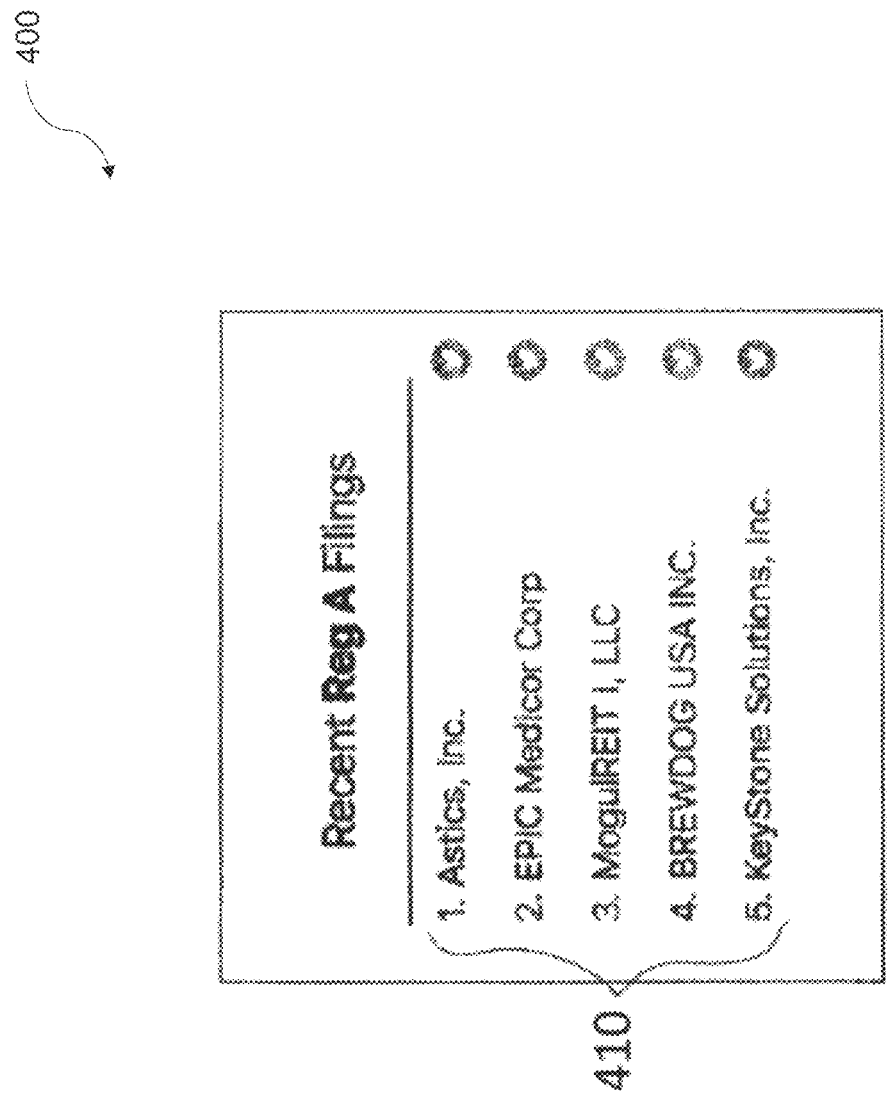
FIG. 4 shows a diagram of suggested filings, according to an embodiment of the present invention.

Referring now to FIG. 4, a diagram of suggested filings 410 is illustratively depicted, in accordance with an embodiment of the present invention.

According to an embodiment, the system suggests one or more listings 410 to a user to be promoted. The listings 410 may be related to a particular statute, such as Reg. A. The listings 410 may also be suggested for any other reason determined by the system.

Referring now to FIG. 5, a diagram of a request to promote one or more listings is illustratively depicted, in accordance with an embodiment of the present invention.

According to an embodiment, the system requests the user 510 to determine which listing or listings 520 the user wishes to promote. This ensures that the user is aware of which listings will be in the promotional widget.

Figure 6:
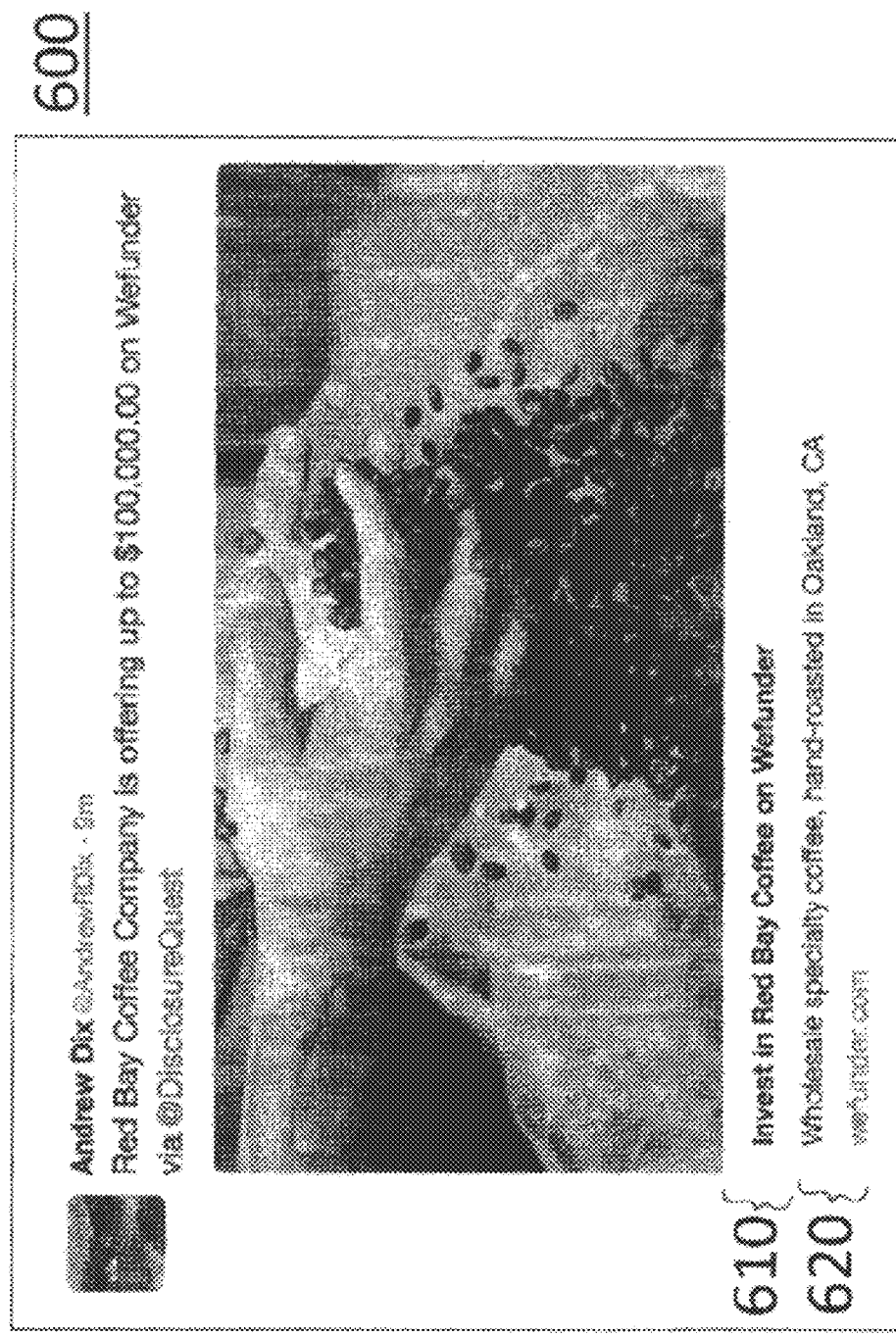
FIG. 6 shows a promotional digital widget, displayed on a social media platform, according to an embodiment of the present invention.

Referring now to FIG. 6, a promotional widget 600, displayed on a social media platform, is illustratively depicted, in accordance with an embodiment of the present invention.

According to the embodiment shown in FIG. 6, the promotional widget 600 includes the name of the product/company 610 that is being listed and a brief description 620 of the product/company.

Figure 7:
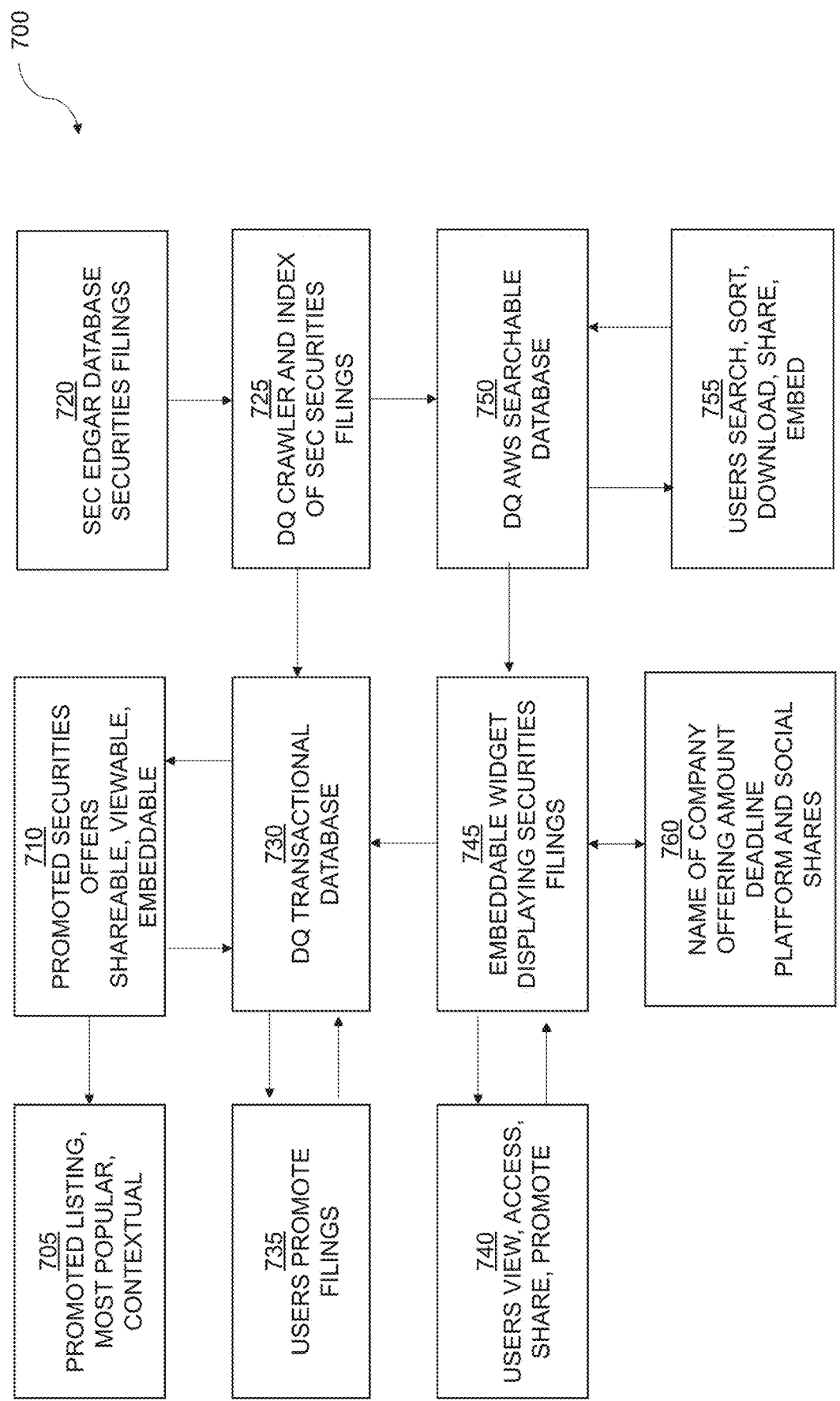
FIG. 7 shows a block/flow diagram of a method for promoting securities information, according to an embodiment of the present invention.

Referring now to FIG. 7, a block/flow diagram of a method 700 for promoting securities information is illustratively depicted, in accordance with an embodiment of the present invention.

According to an embodiment, a list of promoted securities offers is created 710, which can be shareable, viewable, embeddable, etc. Of these promoted securities offers 710, a promoted listing 705 is created, which may be the most popular listing and may be described contextually.

A system, composed of both hardware and software, stores a database of securities information, such as, e.g., automated information, as updated by the Securities and Exchange Commission (SEC) disclosure database, the Electronic Data Gathering, Analysis, and Retrieval (EDGAR) system 720. The SEC EDGAR database 720 is accessible by the Disclosure Quest (DQ) Crawler and Index of SEC Securities Filings 725.

From the DQ Crawler and Index of SEC Securities Filings 725, a DQ Transactional Database 730 is created which has mutual interactions with the promoted securities offers 710. From the DQ transactional database 730 user promoted filings 735 are created. According to an embodiment, the DQ Crawler and Index of SEC Securities Filings 725 is accessible through a DQ Amazon Web Services (AWS) searchable database 750 which enables users to search, sort, download, share embed, etc. 755 data from the database 750.

According to an embodiment, an embeddable widget 745 displaying securities filings is created. The widget 745 may be sent to the DQ transactional database 730 and may include identifiable information 760 such as, e.g., the name of a company, an offering amount deadline, platform and social shares, etc. According to an embodiment, users are able to view, access, share, and promote 740 the embeddable widget 745.

Figure 8:
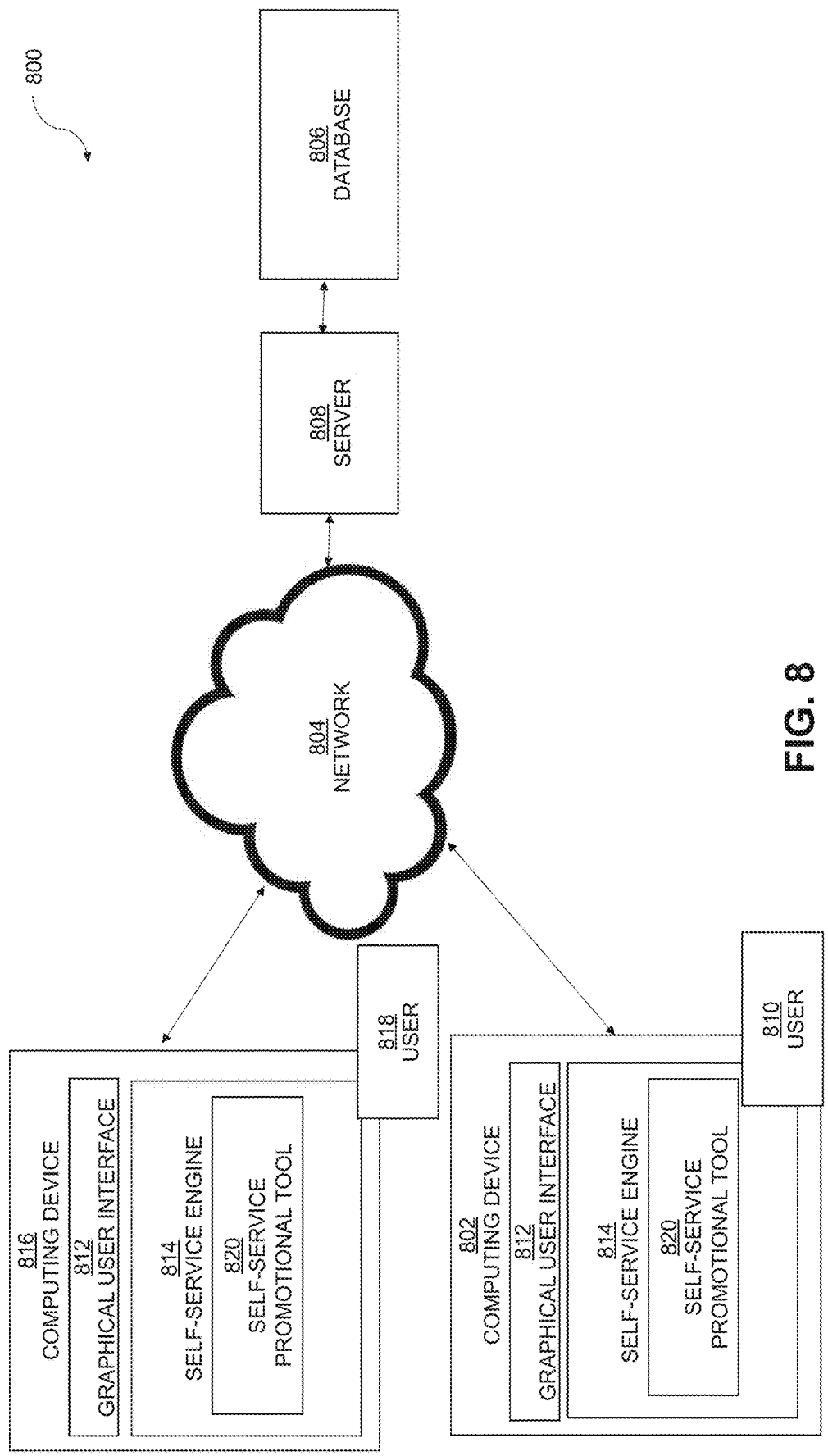
FIG. 8 shows a schematic diagram of a system, according to an embodiment of the present invention.

FIG. 8 shows a schematic diagram of a system, according to an embodiment of the present invention. Further, as shown in FIG. 8, a self-service software engine 814 may operate in a distributed environment 800 to promote registered securities offerings or registered digital asset offerings. In general, a distributed environment, such as cloud computing technology, delivers computing power and storage capacity as a service to a community of user devices via a network. An application and data are stored on a distributed environment server. A user device accesses the applications and the data using a client that stores and executes a browser application.

Specifically, FIG. 8 depicts a simplified diagram of the distributed environment 800. In the illustrated embodiment, the distributed environment 800 includes a first client computing device 802 and a second client computing device 816, which are each configured to execute and operate a client application such as a web browser over one or more network(s) 804. Specifically, each of the first client computing device 802 and the second client computing device 816 include a graphical user interface (GUI) 812 and a self-service engine 814. The self-service engine 814 includes a self-service promotional tool 820.

A first user 810 interacts with the first client computing device 802 and a second user 818 interacts with the second client computing device 816. A server 808 may be communicatively coupled with each of the first client computing device 802 and the second client computing device 816 via the network 804. Additionally, the server 808 may communicate with a database 806.

It should be appreciated that in examples, the self-service engine 814 may be an application, a software program, a service, or a software platform. Furthermore, each of the first client computing device 802 and the second client computing device 816 may be a computer, a laptop computer, a smartphone, and/or a tablet, among other examples not explicitly listed herein. Additionally, it should be appreciated that a quantity of the computing devices and the databases are not limited to any particular quantity.

In various embodiments, the server 808 may be adapted to run one or more services or software applications. In some embodiments, these services may be offered as web-based or cloud services or under a Software as a Service (SaaS) model to the first user 810 of the first client computing device 802 and the second user 818 of the second client computing device 816.

The first user 810 operating the first client computing device 802 and the second user 818 operating the second client computing device 816 may in turn utilize one or more client applications to interact with the server 808 to utilize various software components implemented on the server 808. These components may be implemented in hardware, firmware, software, or combinations thereof. It should be appreciated that various different system configurations are possible, which may be different from the distributed environment 800. The embodiment shown in FIG. 8 is thus one example of a distributed system for implementing an embodiment system and is not intended to be limiting.

In examples, the first user 810 and/or the second user 818 may utilize the distributed environment 800 of FIG. 8 to access registered securities information pertaining to an offering and may access the self-service engine 814, which is distributed across many different domains across the Internet. The first user 810 and/or the second user 818 can seek to promote a registered securities offering either directly on a main domain or other domains that incorporate the self-service engine 814. The self-service engine 814 allows the first user 810 and/or the second user 818 to view securities information, create a promotion 1000 (of FIG. 10) including dynamic information and social media connections, review the promotion 1000, and then purchase the promotion 1000. The first user 810 and/or the second user 818 may select one or more domains as to where the promotion 1000 may be viewed over any designated period of time.

Figure 10:
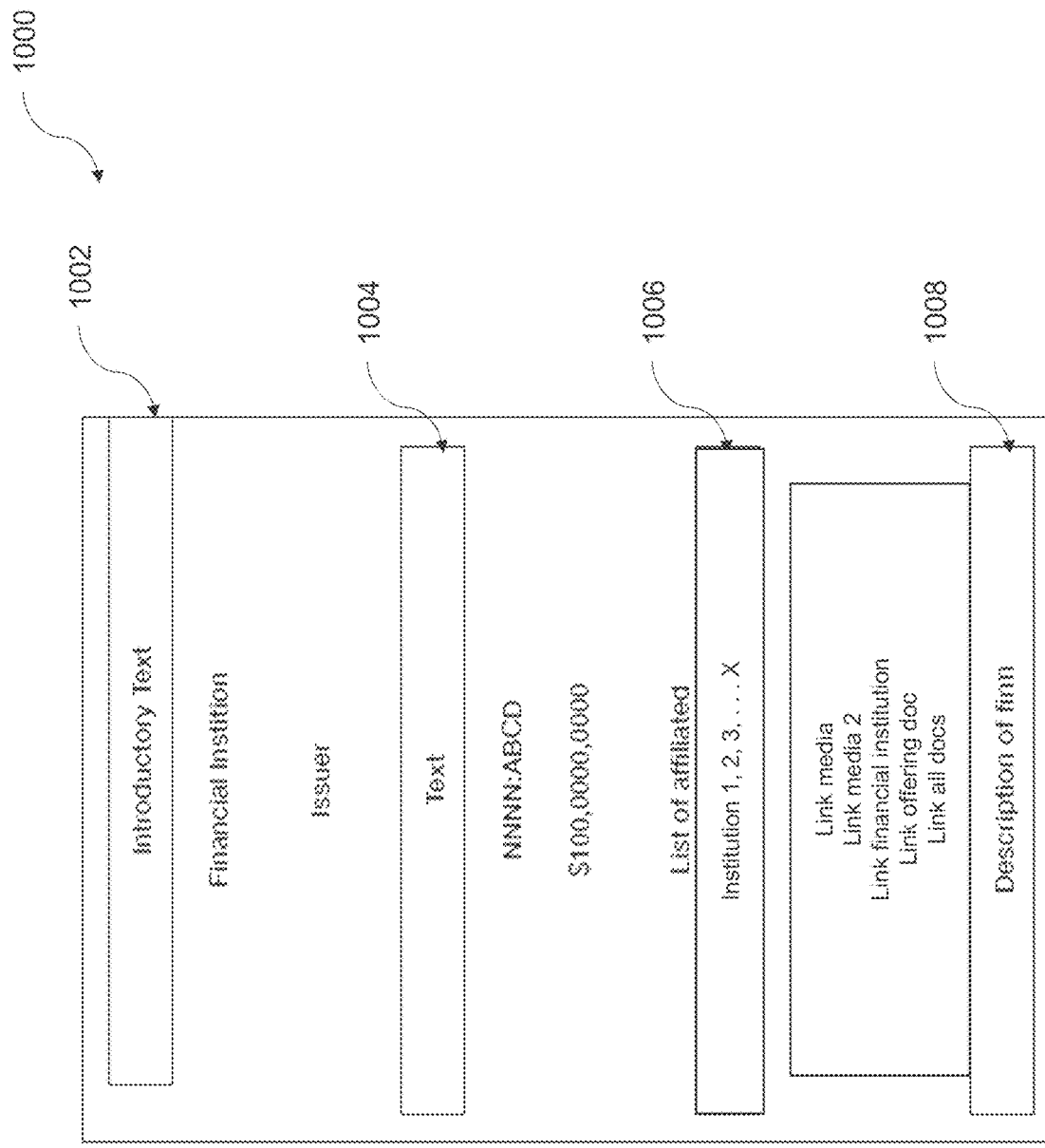
FIG. 10 shows a schematic diagram of a draft promotion, according to an embodiment of the present invention.

A viewer may see/view the promotion 1000 on at least one of the domains, where the viewer may access a link to detailed information, including: offering documents (e.g., shown in a description of a firm 1008 in the promotion 1000 of FIG. 10), opportunities to participate, multimedia affiliated with the offering (e.g., shown as the description of a firm 1008 including media links, links to a financial institution, links to offering documentation, etc. in the promotion 1000 of FIG. 10), issuer information (e.g., shown as introductory text 1002 in the promotion 1000 of FIG. 10), information associated with an affiliated financial services firm (e.g., shown as the introductory text 1002 and a listing of the institution 1006 in the promotion 1000 of FIG. 10), and data specific to the individual offering (e.g., shown as text 1004 of the promotion 1000 in FIG. 10).

Moreover, the viewer may share or further distribute the promotion 1000 by utilizing social media platforms, including, but not limited to, Twitter, Facebook, Telegram, Reddit, and more. The viewer may also save or share the promotion 1000 directly with other applications, such as via email, slack or other distribution channels.

It should be appreciated that the application (e.g., the self-service engine 814) directly accesses information databased on the server 808 that is sourced from publicly available information, such as EDGAR. This information includes registered securities offering documents including an S-1 and an amended S-1s, as well as business specific information, such as CIK, SIK, S-8, exchange and other approvals. This information is hosted in a separate application, which is publicly available and searchable on the Internet. The application is accessed via a main domain, as well as distributed across another domain or multiple domains, to review the information pertaining to a registered securities offering.

Figure 9:
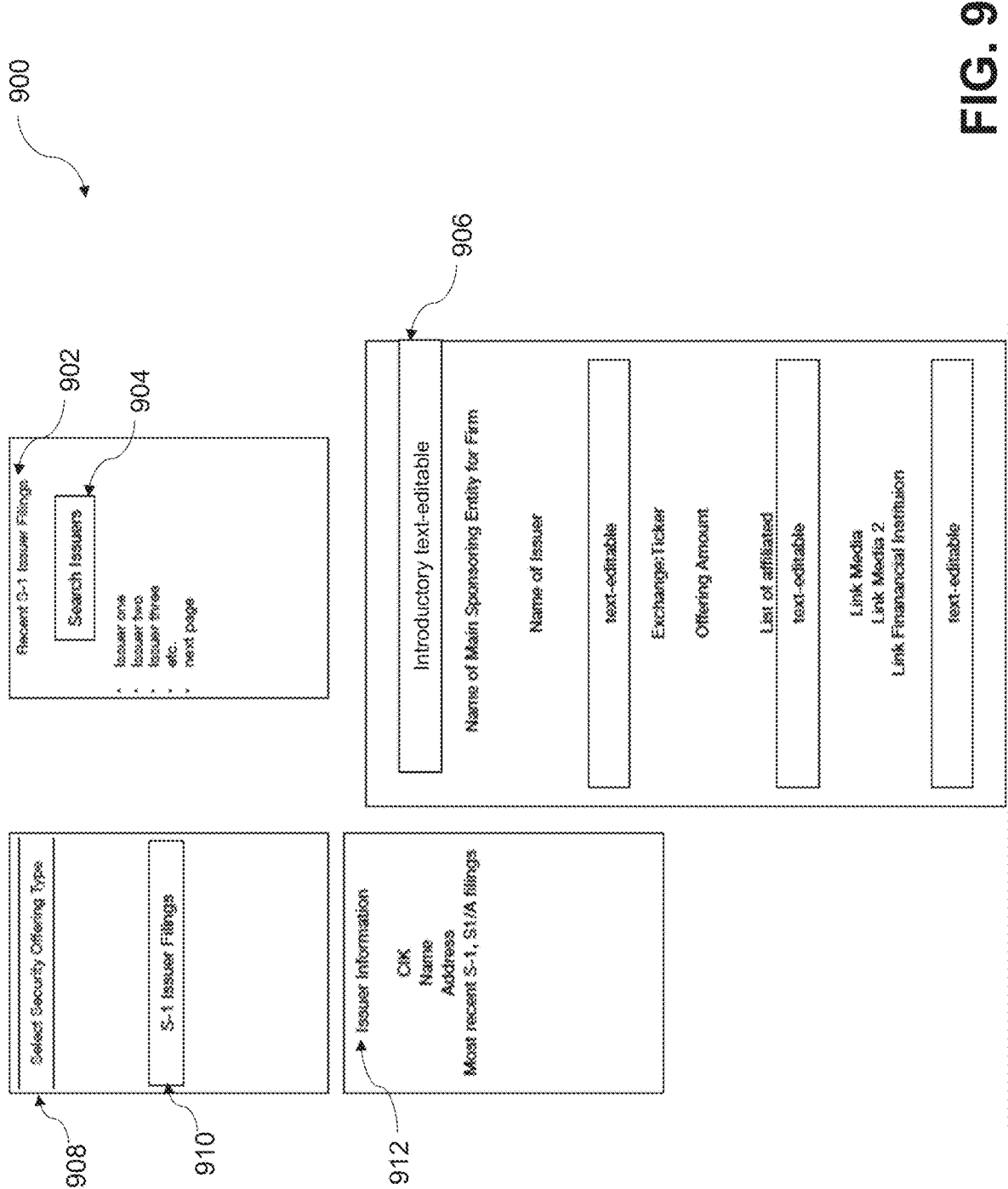
FIG. 9 shows a schematic diagram of various editable components of a promotion, according to an embodiment of the present invention.

FIG. 9 shows a schematic diagram of various editable components of a promotion, according to an embodiment of the present invention. As shown in FIG. 9, the first user 810 and/or the second user 818 may view a name of the issuer (e.g., issuer information 912), CIK, SIK, business information and initial public offering documents and have the option of promoting the offering on a single domain or multiple domains in the distributed environment 800. The first user 810 and/or the second user 818 may select a security offering type 908, such as an S-1 issuer filing 910, and may further filter and search 904 for issuers via recent S-1 issuer filings 902.

The first user 810 and/or the second user 818 may also add additional information into an initial promotion 900 of FIG. 9 via editable text 906, including, but not to: affiliated financial services firms, listing information, exchange or alternate trading systems (ATS) or other marketplaces, offering amount, a type of securities offering, purchase information, a description of a company, links to required and selected offering documents, images (e.g., a JPG, PNG, etc.), a video, other multimedia information, and/or social media information (including, but not limited to, Twitter, Facebook, Telegram, LinkedIn, Reddit, Snap, Instagram, etc.), among other information.

The first user 810 and/or the second user 818 may also choose to offer an email option or a save/print option. In other implementations, the first user 810 and/or the second user 818 may include contact information pertaining to principles engaged in the offering. The first user 810 and/or the second user 818 may then select a duration for the promotion. In other embodiments, the first user 810 and/or the second user 818 may select a single domain for presentation or multiple domains.

FIG. 10 shows a schematic diagram of a draft promotion, according to an embodiment of the present invention. The promotion 1000 is presented in a draft form that may be edited or deleted. If the first user 810 and/or the second user 818 chooses, a purchase is made for the promotion 1000 and is then displayed on a single domain or on multiple domains. Viewers may then see the promotion 1000 on a single domain or on the multiple domains and may interact with the promotion 1000 to read, share, watch, or distribute on their personal social networks. The viewers may also read the selected registration documents or links to the platforms where a purchase may be made via an exchange, ATS, or other marketplace.

The promotion 1000 may display the viewing activity such as, but not limited to, shares in Twitter, Facebook, Telegram, LinkedIn, Reddit, Snap, Instagram, etc. The promotion 1000 may display a number of document reads including clicks to platforms where a purchase may be made. Following the duration of the promotion 1000 as defined by the first user 810 and/or the second user 818, the first user 810 and/or the second user 818 will have the option to extend or select another domain or multiple domains to continue the distribution of the promotion 1000 until the first user 810 and/or the second user 818 so decides to end the promotion 1000.

All of the data affiliated with the promotion 1000 will be databased and accessible to an administrator where the information may be repackaged and displayed in other promotional widgets, such as: Most Popular Offering, Most Shared Offering, Most Funding Raised, etc. These promotional widgets may be displayed on a single domain or on multiple domains. Each widget shall provide links to securities offering information, including, but not limited to, the information as outlined in the promotion 1000.

Figure 11:
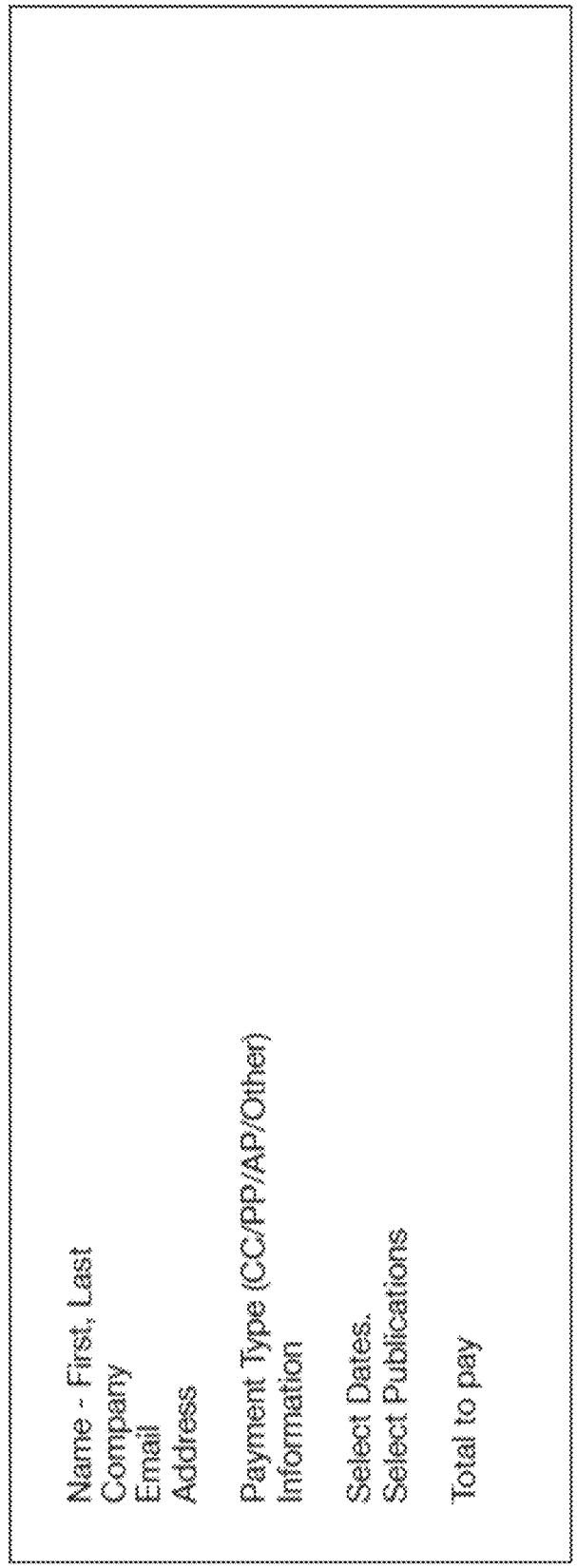
FIG. 11 shows a schematic diagram of an advertisement, according to an embodiment of the present invention.

FIG. 11 shows a schematic diagram of an advertisement, according to an embodiment of the present invention. Furthermore, the self-service promotional tool 820 may utilize securities data retrieved from the Securities and Exchange Commission's EDGAR company filings to dynamical create a tombstone type digital display advertisement 1100 of FIG. 11 in the distributed environment 800. The advertisement 1100 includes a name, company, payment type, information, selected dates, selected publications, and/or a total amount of payment, among other information.

More specifically, first user 810 and/or the second user 818 may access a digital tool (e.g., the self-service promotional tool 820) to review specific regulatory documents required by compliance officials to pursue a public offering of securities. Furthermore, the first user 810 and/or the second user 818 may search, read, download, save, print these documents within the self-service engine 814.

Additionally, the first user 810 and/or the second user 818 may choose to promote a filing, specifically an S-1 document, to create the advertisement 1100. The self-service engine 814 provides a transactional interface that allows for a purchase of a specific display advertisement and promotion of the advertisement 1100 on one or many digital news and informational sites. Once a digital promotion (e.g., the advertisement 1100) is purchased and displayed on one or more digital news and informational sites, viewers may review the information and read linked information on the issuer, financial service provider, other information providers, and issuing platforms. The first user 810 and/or the second user 818 may share the promoted display advertisement (e.g., the advertisement 1100) on various social media platforms. The first user 810 and/or the second user 818 may also view a video affiliated with the promotion. At the option of a purchaser, the promoted advertisement (e.g., the advertisement 1100) may incorporate a news feed of recent coverage.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate m, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeably throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM47501UB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller, Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blu-ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo!Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C#and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

Various other components may be included and called upon for providing for aspects of the teachings herein. For example, additional materials, combinations of materials and/or omission of materials may be used to provide for added embodiments that are within the scope of the teachings herein. In the present application a variety of variables are described, including but not limited to components and conditions. It is to be understood that any combination of any of these variables can define an embodiment of the disclosure. Other combinations of articles, components, conditions, and/or methods can also be specifically selected from among variables listed herein to define other embodiments, as would be apparent to those of ordinary skill in the art.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

The many elements of the present invention make it unique in the field. The novelty is illustrated by the various options for nearly every aspect of the invention that allow it to be used in the proper exercise form by a variety of users, both in terms of body size and fitness level. Additionally, there is a wide range of exercises available to any user of the present invention, and users can perform exercises that use the upper and lower extremity muscle groups simultaneously.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system having a distributed environment, the system comprising:
    a first client computing device associated with a first user;
    a second client computing device associated with a second user, wherein each of the first client computing device and the second client computing device comprise a graphical user interface (GUI) and a self-service promotional engine application to advertise a securities offering in a regulatory compliant manner;
    a network;
    a server communicatively coupled with each of the first client computing device and the second client computing device via the network;
    a distributed ledger communicatively coupled with the server;
    one or more securities filings retained in an indexed database comprising of a distributed ledger, the indexed database has targeted fields for securities offerings;
    the self-service engine comprising a self-service promotional tool, the self-service engine configured to allow the first user or the second user to access information in the database, via a digital application that is sourced from an Electronic Data Gathering, Analysis, and Retrieval (EDGAR) system of a Securities and Exchange Commission (SEC) when the one or more filings are reindexed comprising the self-service engine to parse and structure the targeted fields of the database to segregate and display the one or more filings as content;
    wherein the self-service promotional tool configured for the first user to access the one or more filings retained in the indexed database;
    wherein at least one of the one or more filings is selected to be transformed into a shareable, promotional digital widget having an embeddable piece of code configured to display a description of each of the at least one of the selected filings to one or more second users;
    a promotional controller electrically connected to the shareable digital widget;
    the promotional controller is digitally connected to the distributed ledger to retain transactional data of a promoted filing sourced from the SEC's EDGAR system;
    the data indexed from the SEC's EDGAR system validates the information as received from an issuer of the securities offering;
    the promote controller is electrically connected to the distributed ledger to retain securities filing data sourced from the SEC's EDGAR system;
    the promotional controller to combine the transactional data of the database with the system filing data of the database to form a combined dataset; and to enable an issuer or other promoter to advertise a securities offering in a legally compliant method.

2. The system of claim 1, wherein the self-service promotional engine is further configured to:
    receive, from the first user or the second user, a promotion that comprises selected fielded data, from the SEC EDGAR database.

3. The system of claim 2, wherein the self-service promotional engine is further configured to:
    receive, from the first user or the second user, additional information for the promotion.

4. The system of claim 3, wherein the additional information is selected from the group consisting of: affiliated financial services firms, listing information, exchange or alternate trading systems (ATS) or other marketplaces, offering amount, a type of securities offering, investment information, a description of a company, links to required and selected offering documents, multimedia information, and social media information.

5. The system of claim 3, wherein the self-service engine is further configured to:
    receive, from the first user or the second user, one or many selected domains for where the promotion will be viewed and actionable by an investor during a selected time frame; and
    receive, from the first user or the second user, a payment to purchase the promotion on the one or many selected domains for the selected time frame.

6. The system of claim 5, wherein the self-service promotional engine is further configured to:
    post the promotion on the selected one or many domains for the selected time frame.

7. The system of claim 6, wherein the promotion comprises: offering documentation, opportunities to invest, multimedia affiliated with the offering, issuer information, information associated with an affiliated financial services firm, and data specific to the offering.

8. The system of claim 6, wherein, upon viewing the promotion on the selected domains during the selected time frame, a viewer may distribute the promotion via one or many social media platforms.

9. The system of claim 7, wherein the promotion created is compliant under securities law pertaining to each individual securities exemption or public offering.

10. A method executed by a self-service promotional engine of a computing device in a distributed ledger environment, the method comprising:
    accessing, via a digital application in electrical communication with a self-service promotional engine, information sourced from an Electronic Data Gathering, Analysis, and Retrieval (EDGAR) system of a Securities and Exchange Commission (SEC); and
    wherein the information comprising one or more filings retained in an indexed database comprising a database and an elasticsearch database, the indexed database has targeted fields;
    providing a self-service promotional engine comprising a self-service promotional tool;
    reindexing the one or more filings comprising:
        parsing, via the self-service engine, the targeted fields segregate the one or more filings; and
        structuring, via the self-service engine, the targeted fields of the indexed database to display the one or more filings as content;
    accessing, via the self-service promotional tool, the one or more filings retained in the indexed database of a graphic user interface (GUI);
    transforming the at least one of the one or more filings into a shareable digital widget having an embeddable or sharable code;
    displaying a description of each of the one or more filings to one or more second users;
    providing a promote controller digitally connected to the shareable digital widget, the promote controller is electrically connected to a distributed ledger to retain transactional data of a promoted filing sourced from the SEC's EDGAR system, the promote controller is electrically connected to the database to retain system filing data sourced from the SEC's EDGAR system;

combining, via the promote controller, the transactional data of the database with the system filing data of the database to generate a combined dataset; and formatting and inserting, via the promote controller, the combined dataset into one or more predetermined templates; and receiving, from the user, a promotion that comprises at least a portion of the information from the EDGAR system, selected domains for where the promotion will be viewed, a selected time frame for posting the promotion to the selected domains, and a payment from the user to post the promotion on the selected domains for the selected time frame.

11. The method of claim 10, further comprising:
receiving, from the user, additional information for the promotion, wherein the additional information is selected from the group consisting of: affiliated financial services firms, listing information, exchange, alternate trading systems (ATS) or other marketplaces, offering amount, a type of securities offering, purchase information, a description of a company, links to required and selected offering documents, multimedia information, and social media information.

12. The method of claim 10, further comprising:
in response to viewing the promotion on the selected domains during a selected timeframe, distributing, by a viewer, the promotion by one or many social media platforms.

13. The method of claim 10, further comprising:
in response to viewing the promotion on the selected domains during the selected time frame, interacting, by a viewer, with the promotion to make a purchase.

14. The method of claim 10, further comprising:
detecting an end of the selected time frame; and
providing the user with an option to extend the time frame on the selected domains or select another domain and a new time frame for posting the promotion.

15. The method of claim 14, further comprising:
receiving, from the user, an acceptance of the option to extend the time frame on the selected domains;
receiving another payment from the user for an extension of the time frame on the selected domains; and
posting the promotion to the selected domains for the extended time frame.

16. The method of claim 14, further comprising:
receiving, from the user, an acceptance of the another domain and the new time frame for posting the promotion; and
posting the promotion to the another domain for the new time frame.

17. The method of claim 10, wherein the promotion further comprises a quantity of views, shares, or actions, segmented by domain.

* * * * *